US006978136B2

(12) United States Patent
Jenniges et al.

(10) Patent No.: US 6,978,136 B2
(45) Date of Patent: Dec. 20, 2005

(54) METHOD AND WIRELESS DEVICE FOR ESTABLISHING A COMMUNICATION INTERFACE FOR A COMMUNICATION SESSION

(75) Inventors: Nathaniel J. Jenniges, Grayslake, IL (US); Paul J. Smith, Lake Zurich, IL (US); Jeremy T. Jobling, Grayslake, IL (US); Sanjay Gupta, Lakewood, IL (US); Michael A. Glintz, Hainesville, IL (US); Scott H. Ng, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 428 days.

(21) Appl. No.: 10/195,258

(22) Filed: Jul. 15, 2002

(65) Prior Publication Data

US 2004/0203766 A1    Oct. 14, 2004

(51) Int. Cl.[7] .................................................. H04Q 7/20
(52) U.S. Cl. ................. 455/435.1; 455/433; 455/412.2; 370/355
(58) Field of Search .............................. 455/435.1, 403, 455/414.1, 466, 561, 567, 412.1–412.2, 413, 455/418, 433, 44, 566; 370/355–360

(56) References Cited

U.S. PATENT DOCUMENTS

| 5,889,852 | A   |   | 3/1999  | Rosecrans et al. |             |
|-----------|-----|---|---------|------------------|-------------|
| 5,930,700 | A   | * | 7/1999  | Pepper et al.    | 455/435.3   |
| 6,462,665 | B1  | * | 10/2002 | Tarlton et al.   | 340/601     |
| 6,529,737 | B1  | * | 3/2003  | Skinner et al.   | 455/466     |
| 2003/0143982 | A1 | * | 7/2003  | Wolters et al.   | 455/414     |
| 2003/0162539 | A1 | * | 8/2003  | Fiut et al.      | 455/424     |
| 2004/0203363 | A1 | * | 10/2004 | Carlton et al.   | 455/41.2    |
| 2004/0203644 | A1 | * | 10/2004 | Anders et al.    | 455/414.1   |
| 2004/0203941 | A1 | * | 10/2004 | Kaplan et al.    | 455/466     |

FOREIGN PATENT DOCUMENTS

| WO | WO 00/10310    |   | 2/2000 |
| WO | WO 00/51391    |   | 8/2000 |
| WO | WO 00/69140    |   | 11/2000 |
| WO | WO 2060190 A2  | * | 8/2002 |

* cited by examiner

Primary Examiner—CongVan Tran
(74) Attorney, Agent, or Firm—Hisashi D. Watanabe

(57) ABSTRACT

A method (900) and a wireless device (120) for establishing a communication interface for a communication session are described herein. In a communication system, a wireless device (120) may receive presence information associated with a first party. Operated by a second party, the wireless device (120) may generate a notification to alert the second party. The notification may correspond to the presence information associated with the first party. Based on the presence information, the wireless device (120) may provide the communication interface for the communication session between the first and second parties.

21 Claims, 8 Drawing Sheets

METHOD AND WIRELESS DEVICE FOR ESTABLISHING A COMMUNICATION INTERFACE FOR A COMMUNICATION SESSION

TECHNICAL FIELD

The present disclosure relates to wireless communication systems, and more particularly, to a method and a wireless device for establishing a communication interface for a communication session.

BACKGROUND

Typically, a user of a wireless device such as a cellular telephone, a pager, and a combined personal digital assistant (PDA)/phone are notified when the wireless device receives incoming calls, new voicemails, or new text messages. For example, the wireless device may ring to alert the user of an incoming call. The wireless device may also display an icon such as an envelope to represent a new message. Other examples of notifications of an incoming call and/or a new message include flashing a light or changing the color of the display (e.g., from gray-scale to blue electroluminescent). In fact, the user may set the type of notification provided by the wireless device for incoming calls, new voicemails and/or new text messages. For example, the user may set the wireless device to ring different tones. Further, the user may even set the wireless device to vibrate so that the wireless device may discreetly notify the user of an incoming call. Even with all the different notifications provided by the wireless device, the user may initiate a communication session with another party or respond to a communication from another party without any prior knowledge of the status, communication capability, and preference of that party. For example, a wireless device user may not be notified when a contact listed in the phonebook of the wireless device is unavailable. In another example, the user may not know whether the sender of a text message is still online so that they may participate in a chat session. Moreover, a wireless device user may not be notified of the preference of another party. For example, that party may be out of town and wish to communicate via e-mail rather than by voice service to avoid roaming charges. However, the user may not be notified of that party's preference.

One aspect of designing a wireless device is to maximize convenience for the user. In particular, the user should be able to easily determine if another party is available to participate in a communication session and/or the preference of that party for the communication session. Therefore, a need exist for a wireless device to notify the user of the presence information associated with another party and to establish a communication interface for a communication session between the user and that party based on that information.

BRIEF DESCRIPTION OF THE DRAWINGS

This disclosure will be described in terms of several embodiments to illustrate its broad teachings. Reference is also made to the attached drawings.

DETAILED DESCRIPTION

A method and a wireless device for establishing a communication interface for a communication session are described herein. In a communication system, the wireless device may receive presence information associated with a first party such as, but not limited to, a person, a group, a company, and an entity. The presence information may be, but is not limited to, status, communication capability, and preference of the first party. The wireless device may generate a notification to alert a second party, who may be the user of the wireless device. The notification corresponds to the presence information associated with the first party. In particular, the notification generated by the wireless device may be, but is not limited to, a visual notification (e.g., an icon, a graphical image, a light, a text message, a video message, and a color change), an audio notification (e.g., a beep, a tone, an audio message, and a song), and a physical notification (e.g., a vibration, and a temperature change) within the wireless device. The wireless device may automatically generate the notification via a graphical user interface (GUI) within the wireless device to alert the second party. Alternatively, the wireless device may generate a user-selectable notification within the wireless device. For example, the second party may set the wireless device to vibrate when the first party becomes available for a communication session via voice call service. Based on the presence information, the wireless device may provide the communication interface between the first and second parties. That is, the second party may communicate with the first party via the wireless device based on the status, communication capability, and preference of the first party. For example, the wireless device may automatically dial the preferred phone number for the first party so that the second party may communicate with the first party. In another example, the wireless device may query the second party whether to send a text message or leave a voicemail. Nonetheless, the wireless device may establish a communication interface for a communication session between the first and second parties based on the presence information.

Figure 1:
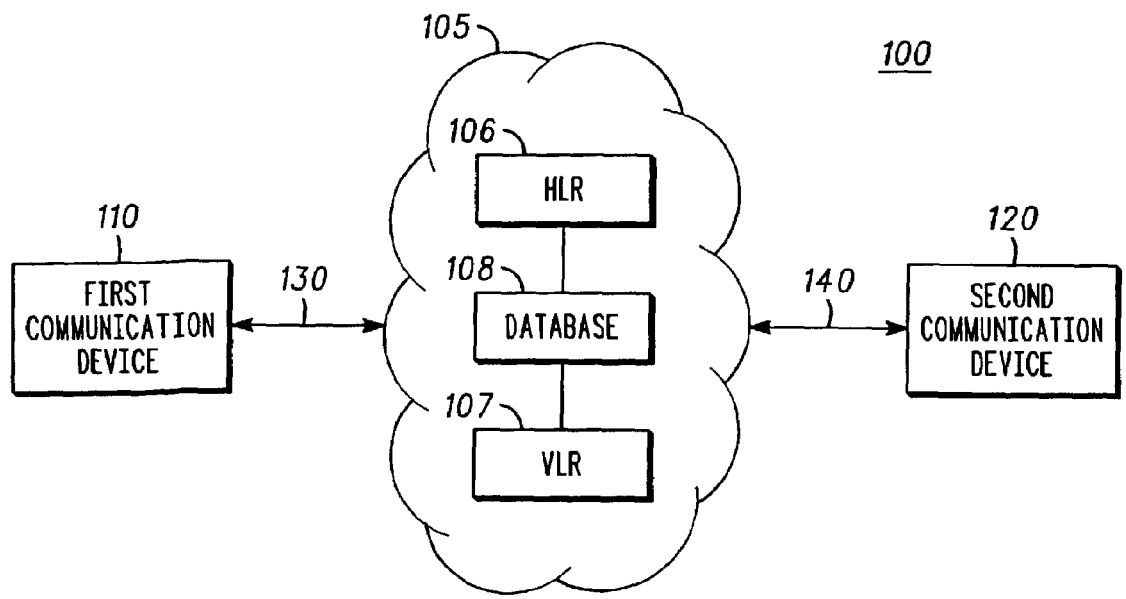
FIG. 1 is a block diagram representation of a communication system.

Referring to FIG. 1, a communication system 100 generally includes a communication network 105, a first communication device 110, and a second communication device 120. The first communication device 110 is in communication with the communication network 105 via a first communication link 130, which may be a wired link and/or a wireless link. Thus, the first communication device 110 may be, but is not limited to, a desktop computer, a laptop computer, a cellular telephone, a personal digital assistant (PDA), and a pager. Further, the first communication device 110 is operated by a first party, which is an entity whose presence information is tracked by the communication network 105. For example, the first party may be, but is not limited to, a person, a group, a department of a company, and a section of an organization. The communication network 105 may track, for example, the status, communication capability, and preference of the first party as persons of ordinary skill in the art will readily recognize. To illustrate the concept of tracking presence information, a home location register (HLR) 106 and/or a visitor location register (VLR) 107 within the communication network 105 may track the presence information associated with the first party.

Accordingly, the presence information may be stored within a database 108 of the communication network 105.

To receive the presence information associated with the first party, the second communication device 120 is in communication with the communication network 105 via a second communication link 140, which may be a wireless link. For example, the second communication device 120 may communicate with the database 108 via the second communication link 140 to receive the presence information. The second communication device 120 may be a wireless device operating in accordance with a wireless communication protocol such as, but not limited to, a code division multiple access (CDMA) based communication protocol, a time division multiple access (TDMA) based communication protocol, and a global system for mobile communications (GSM) based communication protocol. Although the embodiments disclosed herein are particularly well suited for use with wireless devices such as a cellular telephone and a personal digital assistant (PDA), persons of ordinary skill in the art will readily appreciate that the teachings herein are in now way limited to those devices. On the contrary, persons of ordinary skill in the art will readily appreciate that the teachings can be employed with other devices such as a pager.

Figure 2:
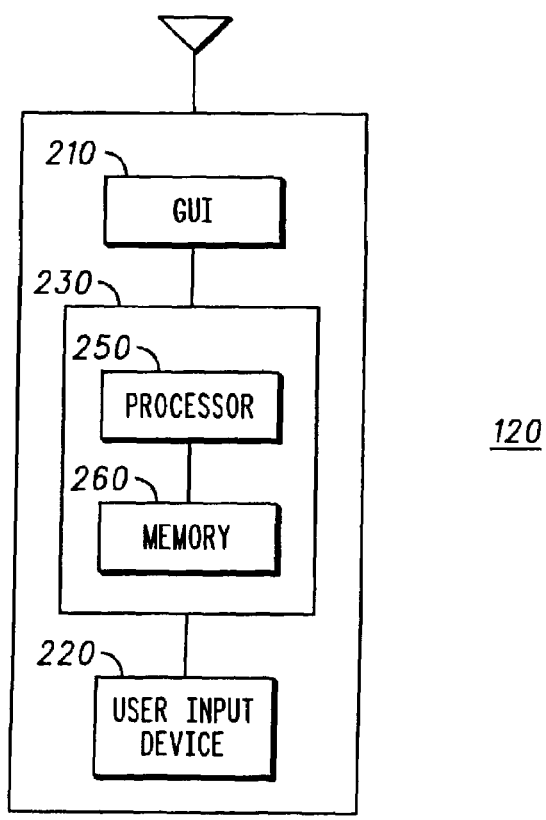
FIG. 2 is a block diagram representation of a wireless device.

Referring to FIG. 2, a wireless device 120 adapted to establish a communication interface for a communication session is shown. The wireless device 120 generally includes a graphical user interface (GUI) 210, a user input device 220, and a controller 230. In particular, the GUI 210 may be, but is not limited to, a liquid-crystal display (LCD). The GUI 210 may be integrated with the user input device 220 into a single component such as a touch-sensitive screen. For example, the touch-sensitive screen may provide an on-screen alphanumeric keyboard for user input and may also be a display. Alternatively, the GUI 210 and the user input device 220 may be separate components. If so, the user input device 220 may be, but is not limited to, a numeric keypad, an alphanumeric keyboard, and a microphone. The controller 230 includes a processor 250 and a memory 260. The processor 250 is operatively coupled to the memory 260, which stores a program or a set of operating instructions for the processor 250. The processor 250 executes the program or the set of operating instructions such that the wireless device 120 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media.

A basic flow for establishing a communication interface based on presence information that may be applied with the wireless device 120 shown in FIG. 2 may start with the wireless device 120 (e.g., via the controller 230) receiving presence information associated with the first party. The presence information may be information associated with, but is not limited to, status (i.e., availability), communication capability, and preference associated with the first party. In particular, the status of the first party may include, but is not limited to, online, offline, available, and unavailable. The presence information may also include information associated with communication capability (i.e., communication services available to the first party for a communication session). For example, the first party may have communication services such as, but not limited to, voice call service, conference call service, voicemail service, e-mail service, short messaging service (SMS), multimedia messaging service (MMS), instant messaging service (IM), and wireless application protocol (WAP) service. Further, the presence information may include a preference of the first party such as, but not limited to, a preferred time, a preferred phone number (e.g., home, work, mobile, and facsimile), a preferred address (e.g., e-mail, instant messaging, Internet protocol (IP), and uniform resource locator (URL)), and a preferred type of media (e.g., via voice, and via e-mail) for the second party to communicate with the first party. For example, voice call service and e-mail service may be available to the first party but the first party may prefer to communicate via e-mail because the first party is out of town and may incur roaming charge for using voice call service. Accordingly, the presence information may indicate the type of media that the first party preferred to communicate is via e-mail.

The wireless device 120 may automatically receive and/or query for the presence information associated with the first party. For example, the wireless device 120 may receive presence information associated with the first party from the communication network 105 (e.g., via the database 108 shown in FIG. 1) in response to a trigger event such as, but not limited to, a registration, a user input, and a change in status. In particular, the user of the wireless device 120 may set the wireless device 120 to alert the user when a party is available as described in detail below. As a result, the wireless device 120 may be automatically updated with the presence information associated with the first party. Alternatively, the wireless device 120 may query the database 108 for presence information associated with, for example, parties listed within a phonebook stored in a memory of the wireless device 120.

Figure 3:
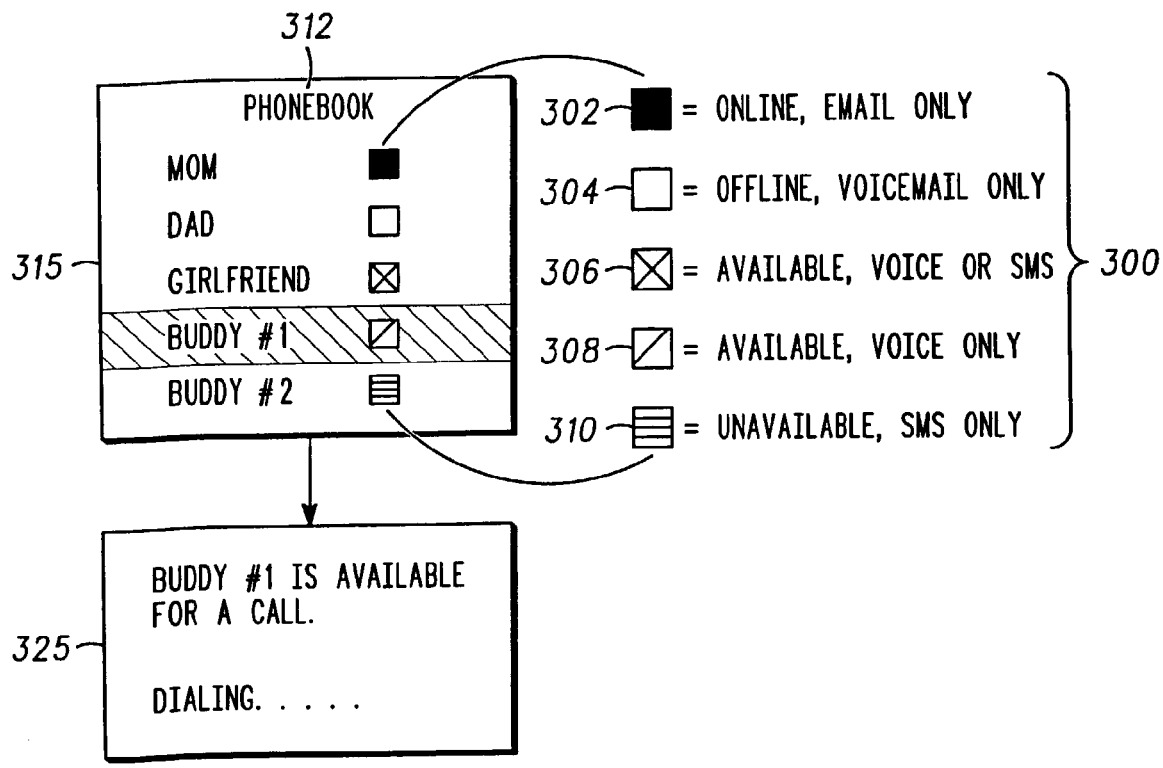
FIGS. 3–9 are visual representations of presence information on a graphical user interface within the wireless device.
Figure 4:
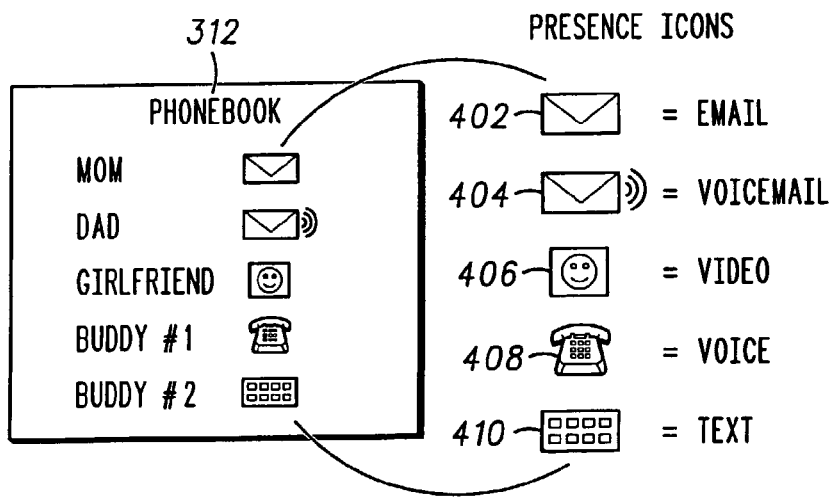

Upon receipt of the presence information, the controller 230 may generate a notification within the wireless device to alert the second party. The notification corresponds to the presence information associated with the first party, which may be listed in a phonebook stored in the memory 260. The controller 230 may display the presence information to the second party via the GUI 210, which may be a liquid-crystal display (LCD). In particular, the controller 230 may generate an icon representing the presence information associated with the first party (i.e., a presence icon) on the GUI 210 as shown in FIG. 3. To illustrate this concept of presence icons 300, a solid square 302 may represent that a party is online and e-mail service is available to communicate with the party whereas a clear square 304 may represent that a party is offline but voicemail service is available. A cross square 306 may represent that a party is available and either voice call service or short messaging service (SMS) is available to communicate with the party. An up-diagonal-line square 308 may represent that a party is available but only voice call service is available. A horizontal-line square 310 may represent that a party is unavailable and only short messaging service (SMS) is available. Persons of ordinary skill in the art will appreciate that the presence information associated with the first party may be represented in many ways. That is, other examples of presence icons may include icons of different shapes, shading, size, and color. Referring to FIG. 4, for example, an icon of an envelope 402 may represent that e-mail service is available whereas an icon of an envelope with sound waves 404 may represent that voice mail service is available. An icon of a screen with a face 406 may indicate that video service is available, an icon of a telephone 408 may indicate that voice call service is available, and an icon of a keyboard 410 may indicate that text message service (e.g., IM and SMS) is available.

As noted above, the first party may be a contact listed in a phonebook 312 stored in the memory 260, and the second party may be the user of the wireless device 120. Based on the presence information, the controller 230 may generate a notification within the wireless device 120 to alert the user of the wireless device 120. Subsequently, the controller 230 may provide the communication interface for a communication session between a contact listed in the phonebook 312 and the user of the wireless device 120.

As shown on screen 315 in FIG. 3, for example, the user may select "Buddy #1" in the phonebook 312 to establish a communication interface for a communication session with Buddy #1. The controller 230 may generate the up-diagonal square 308 to indicate that Buddy #1 is available for a communication session but only voice call service is available to communicate with Buddy #1. Further, if Buddy #1 may prefer to be contacted at his work location then the presence information associated with Buddy #1 may indicate such a preference. Thus, the controller 230 may automatically dial the work phone number for Buddy #1 to establish a communication interface for a communication session with Buddy #1 as shown on screen 325. In contrast, if the Buddy #1 prefers to be contacted on his cellular telephone then the presence information associated with Buddy #1 may indicate the mobile number for Buddy #1 so that the controller 230 may automatically dial that number.

Figure 5:
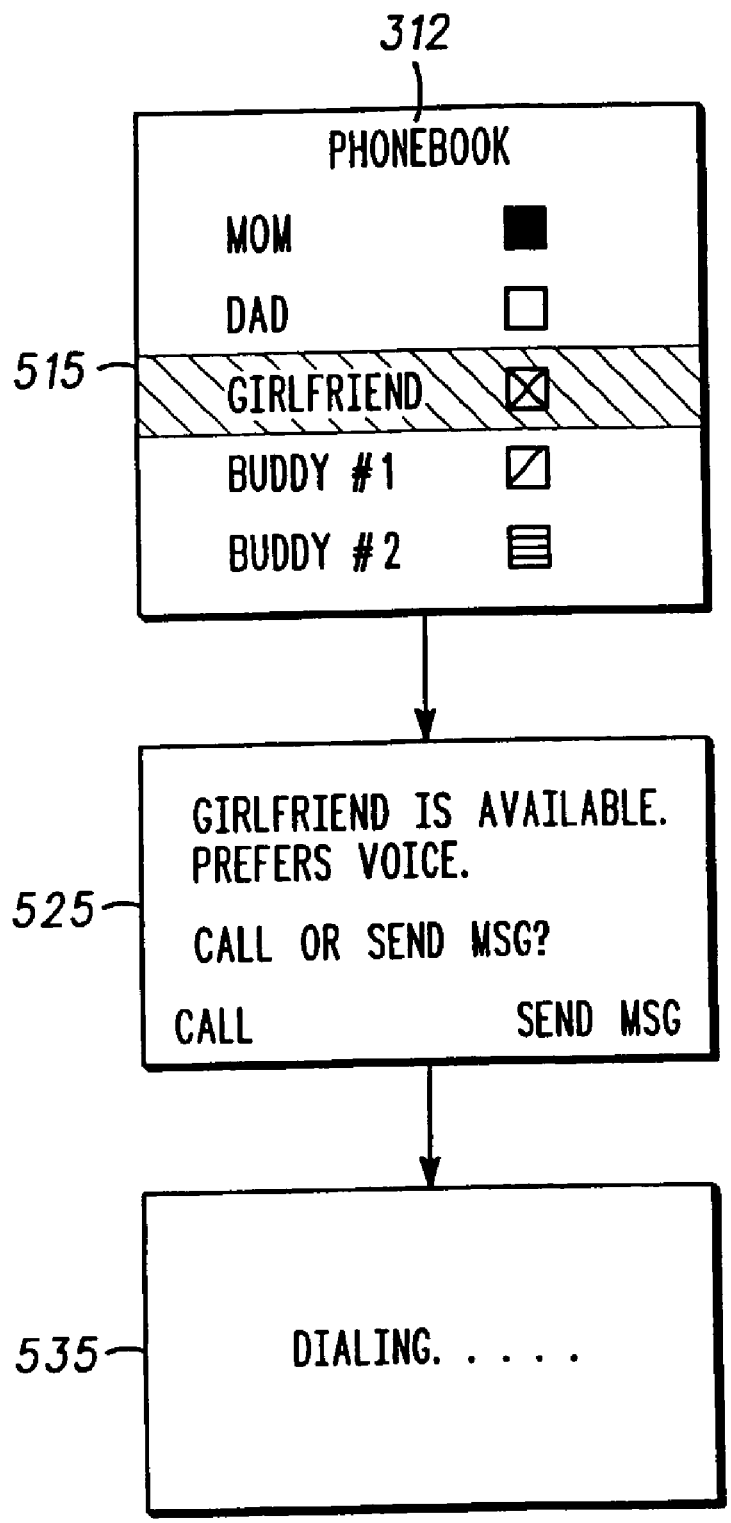

Referring to FIG. 5, in another example, the user may decide to establish a communication interface for a communication session with "Girlfriend." As shown on screen 515, the cross square 306 may indicate that Girlfriend is available, and either voice call service or short messaging service is available to communicate with Girlfriend. Because both voice call service and short messaging services are available, the controller 230 on screen 525 may query the user whether to call or to send a message to Girlfriend. The controller 230 may also indicate that the preference of Girlfriend is a voice call rather than a message. In response to the user's input, the controller 230 provides the communication interface between the user and Girlfriend. That is, if the user selects "CALL" then the controller 230 may dial the phone number for "Girlfriend" as shown on screen 535. To select "CALL," the user may press a button on a numeric keypad and/or an alphanumeric keyboard (i.e., the user input device 220) corresponding to "CALL," press an area on an touch-sensitive screen (i.e., the GUI 210 and the user input device 220 integrated into a single component) corresponding to "CALL," or speak into a microphone (i.e., the user input device 220) to voice-activate the controller 230 to dial the phone number. On the other hand, if the user selects "SENDMSG" in a corresponding manner as described above then the controller 230 may send a message composed by the user. The user may compose the message via the user input device 220.

Figure 6:
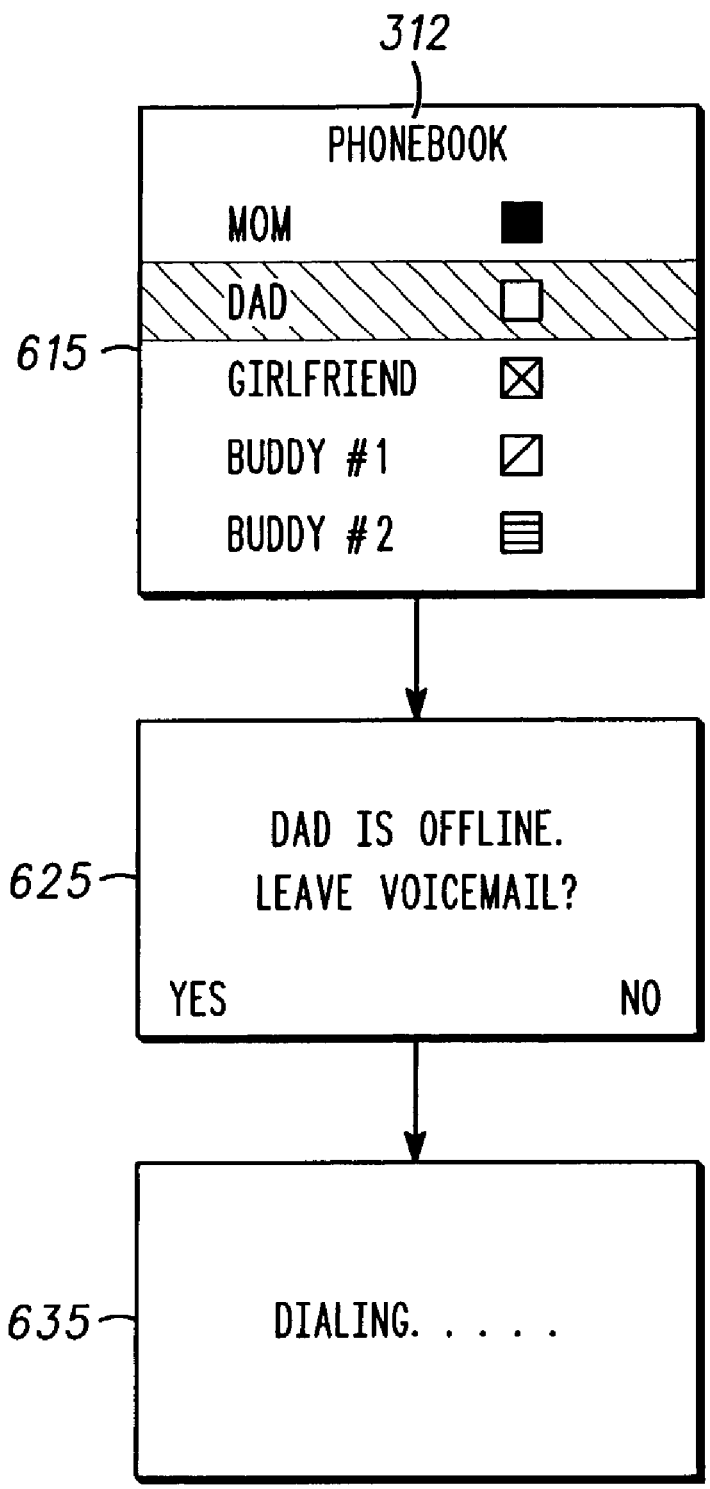

In yet another example, the user may decide to establish a communication interface for a communication session with "Dad" as shown on screen 615 in FIG. 6. The clear square 304 may indicate that Dad is offline but voicemail service is available to communicate with Dad. The controller 230 may query the user whether to leave a voicemail for Dad as shown on screen 625. If the user selects "YES" then the controller 230 may access the voicemail account for Dad as on screen 635 so that the user may leave a voice message. However, if the user selects "NO" then the user may set an alert as described in detail below for when Dad becomes online so that the user may participate in, for example, a chat session with Dad.

Figure 7:
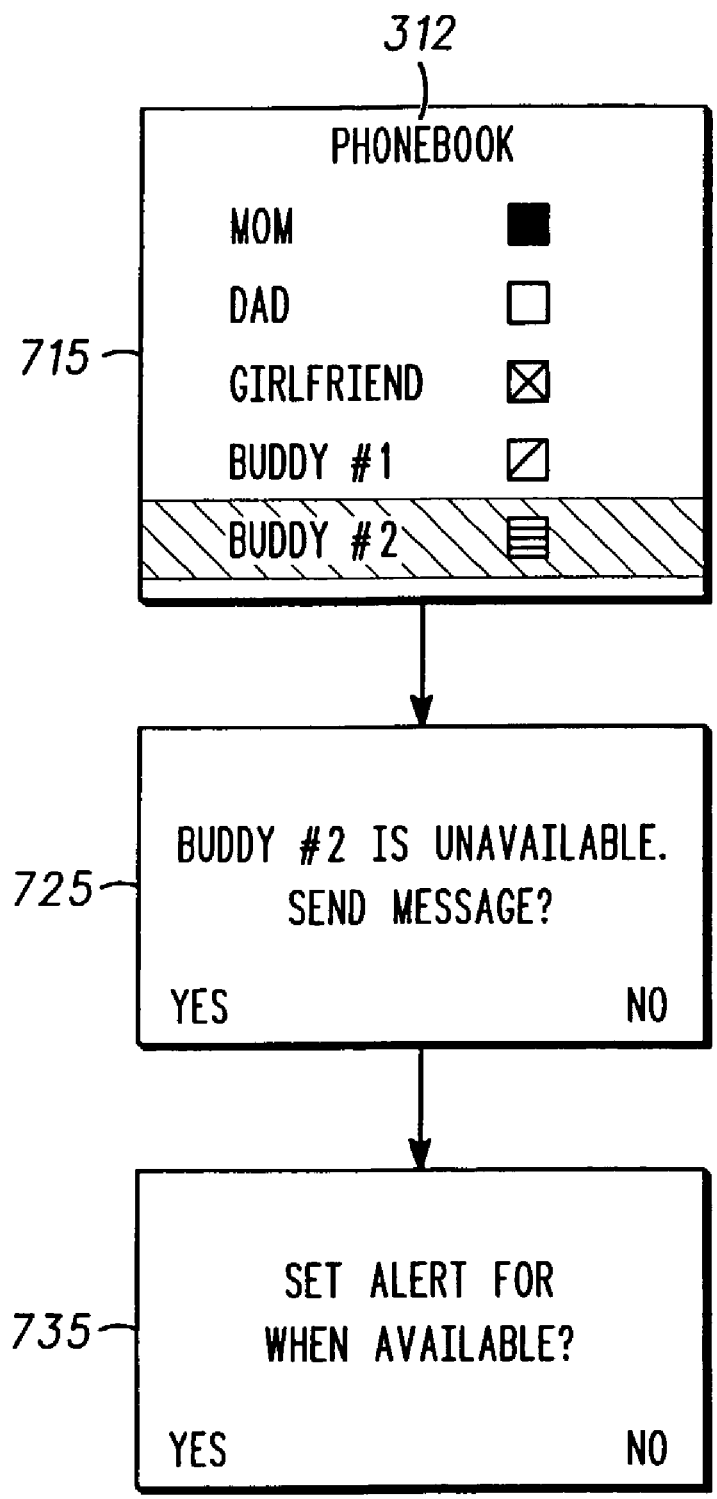

In addition to generating a presence icon on the GUI 210 as described above, the controller 230 may also generate a user-selectable notification such as, but not limited to, a sound notification (e.g., a beep, a tone, an audio message, and a song), a visual notification (e.g., an icon, a graphical image, a light, a text message, an audio message, a video message, a multimedia message, and a color change) and a physical notification (e.g., a vibration, and a temperature change) within the wireless device 120 to further alert the user. Referring to FIG. 7, for example, the user may decide to establish a communication interface for a communication session with Buddy #2 by selecting "Buddy #2" as shown on screen 715. As noted above, the horizontal-line square 310 may indicate that "Buddy #2" is unavailable and only SMS is available to communicate with Buddy #2. On screen 725, the controller 230 may query the user whether to send a message to Buddy #2. However, rather than sending a message to Buddy #2 (i.e., selecting "NO"), the user on screen 735 may set the wireless device 120 to alert the user when "Buddy #2" becomes available (i.e., the user-selectable notification). For example, the user may set the wireless device 120 to vibrate and to turn on a green light when "Buddy #2" becomes available to alert the user that the "Buddy #2" is available for a communication session with the user. Alternatively, the user may set the user-selectable notification for when "Buddy #2" becomes available regardless of whether the user decided to send a message or not.

Figure 8:
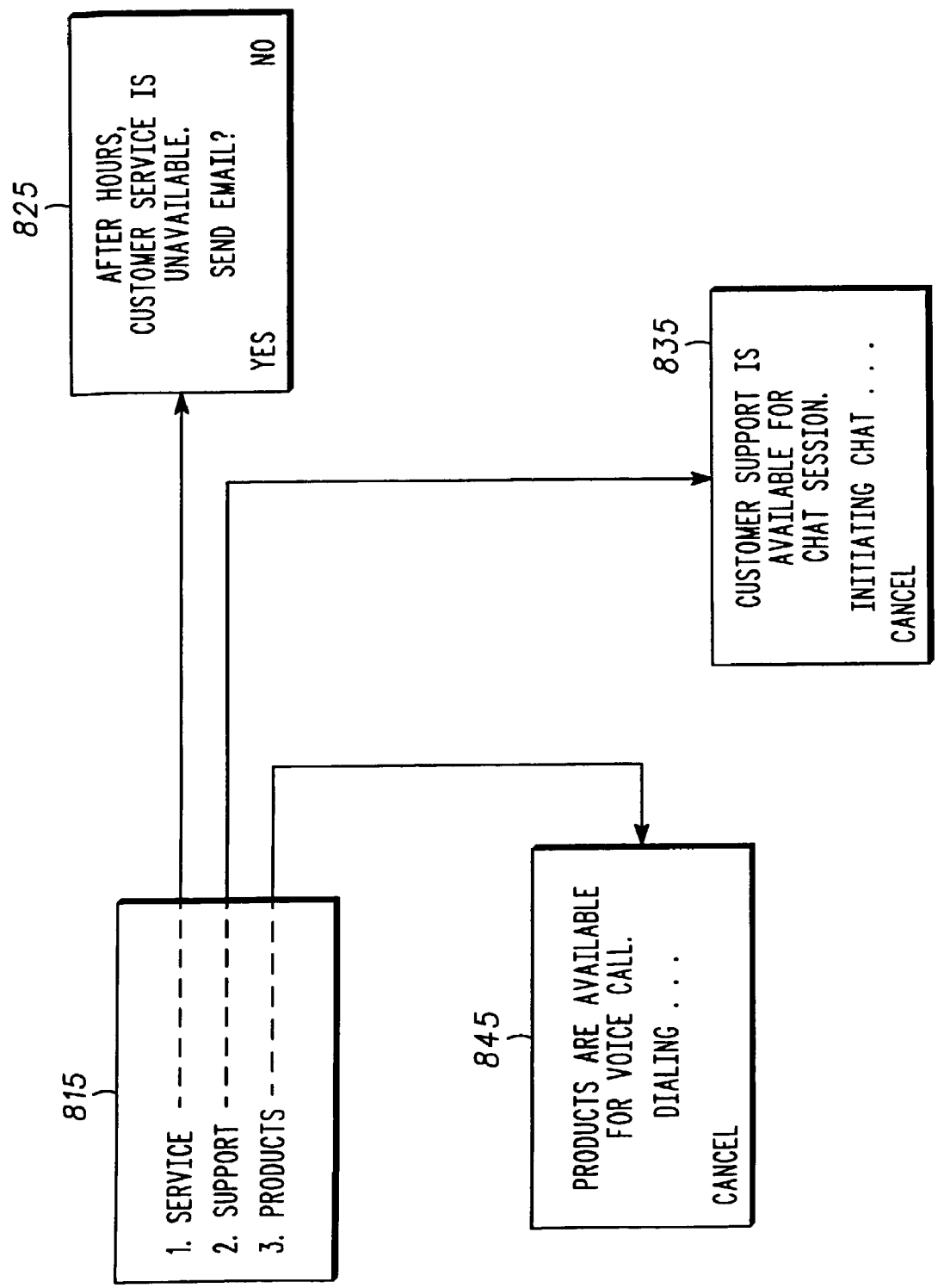

As noted above, the first party may be a company with a number of departments that may operate very differently. For example, the customer service department may operate at different hours than the customer support department. As another example, the customer support department may use different means to communicate than the products department, e.g., instant messaging versus voice call. Thus, the controller 230 may receive presence information associated with each department of a company as shown in FIG. 8. Based on the presence information of the departments listed on screen 815, the user may communicate with each of the departments differently. In particular, if the user selects "SERVICE" after the operating hours of the customer service department then the controller 230 may generate a text message on screen 825 to indicate that it is "AFTER HOURS" and the customer service department is unavailable. Further, suppose that the customer service department prefers to receive e-mails during after hours. Accordingly, the controller 230 on screen 825 may query the user whether to send an e-mail to the customer service department.

In another example, if the user selects "SUPPORT" on screen 815 then the controller 230 on screen 835 may indicate that the customer support department is available, and the controller 230 may automatically initiate a chat session (e.g., instant messaging service) between the user and personnel in the customer support department. If the user selects "PRODUCTS" on screen 815 then the controller 230 may indicate that the products department is available for a voice call, and may also automatically dial the phone number of the products department as on screen 845.

Figure 9:
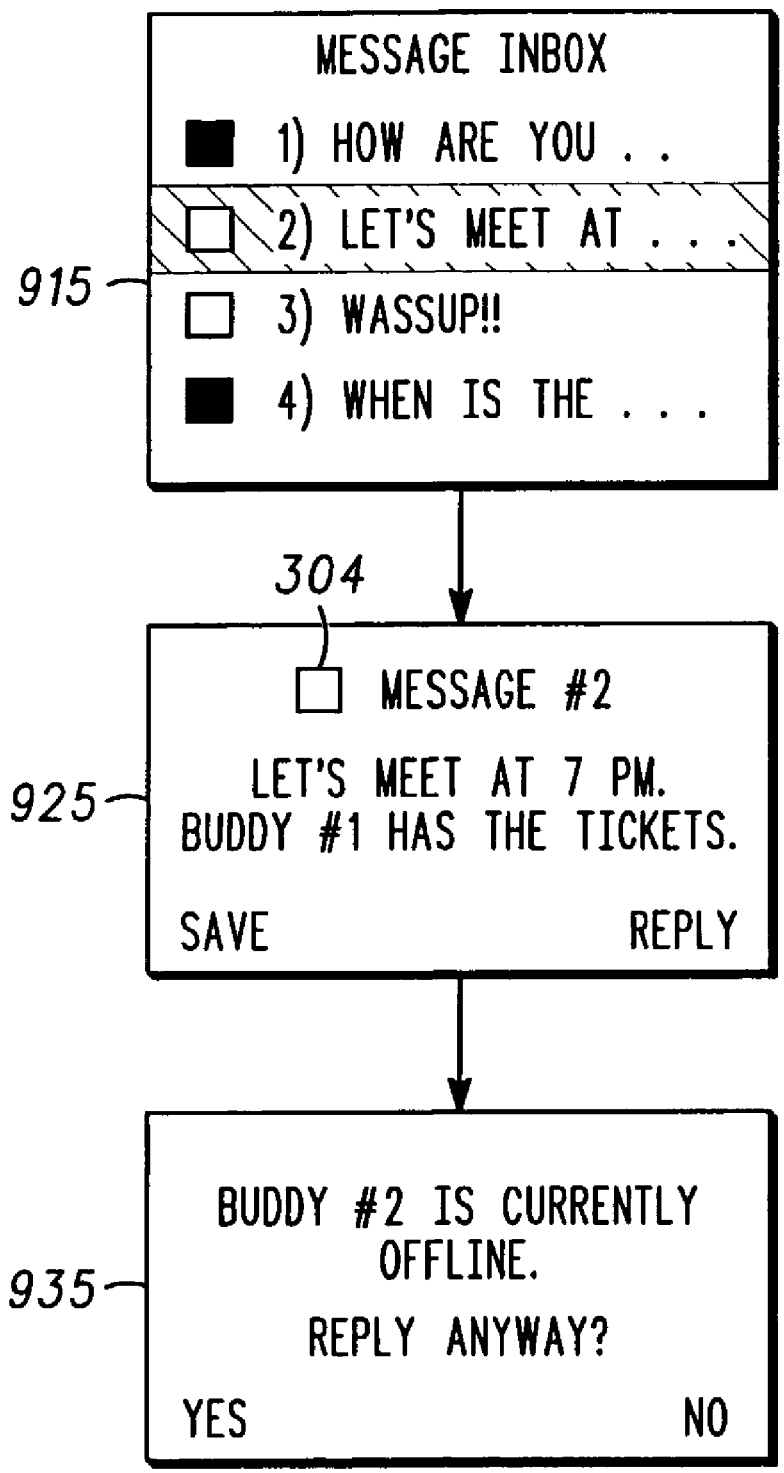

In addition to initiating a communication session with a contact listed in the phonebook 312 as shown in FIGS. 3–8, the user of the wireless device 120 may establish a communication interface for a communication session to respond to a communication from another party based on presence information of that party. Referring to FIG. 9, for example, the user may receive an e-mail message from Buddy #2. As shown on screens 915 and 925, the controller 230 may generate a notification corresponding to the presence information associated with Buddy #2. In particular, the controller 230 may generate the clear square 304 to alert the user that Buddy #2 is offline. On screen 935, the controller 230 may query the user whether to reply to the e-mail message from Buddy #2 even though Buddy #2 is offline. If the user selects "NO" then the controller 230 may return to screen 915. However, if the user selects "YES" then the controller 230 may send a composed e-mail message from the user to Buddy #2.

Figure 10:
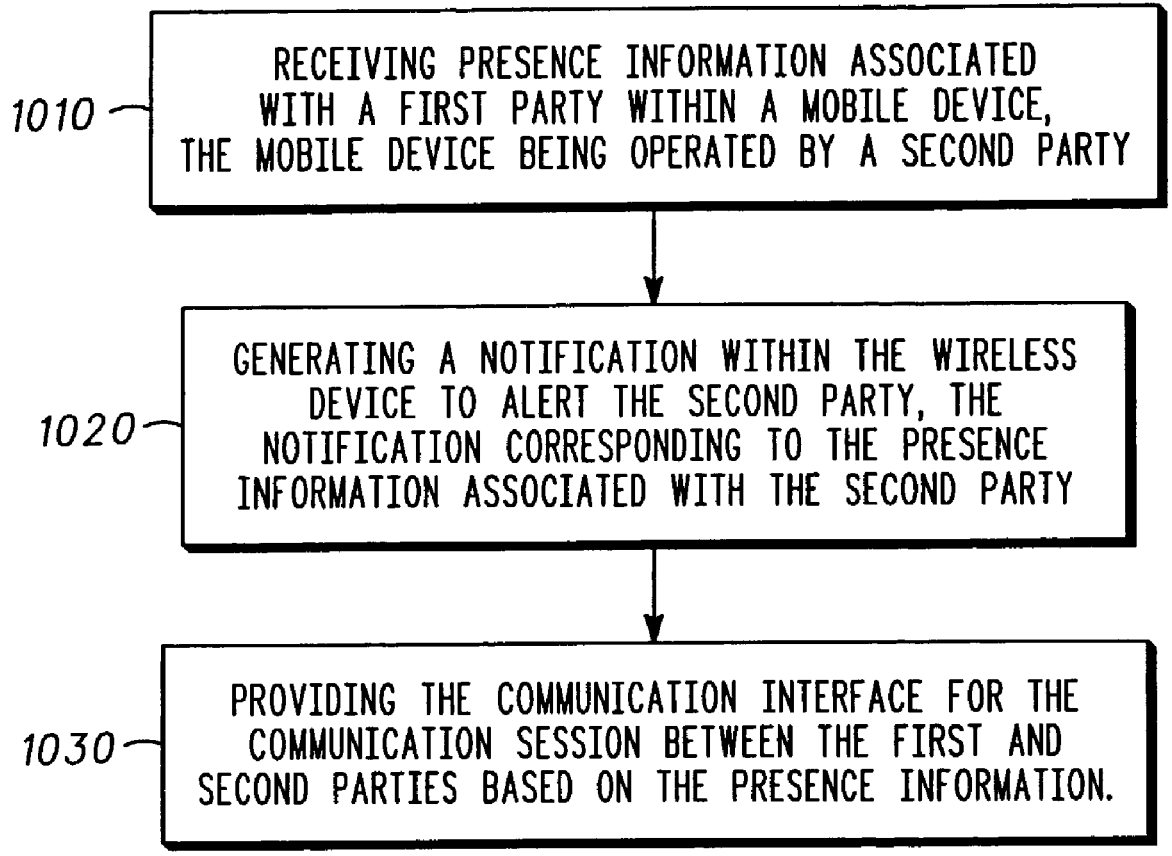
FIG. 10 is a flow diagram illustrating a method for establishing a communication interface for a communication session.

One possible implementation of the computer program executed by the wireless device 120 (e.g., via the processor 350) is illustrated in FIG. 10. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 10, persons of ordinary skill in the art will appreciate that these steps can be performed in other temporal sequences. Again, the flow chart 1000 is merely provided as an example of one way to program the wireless device 120 to establish a communication interface for a communication session. The flow chart 1000 begins at step 1010, wherein the wireless device 120 receives presence information associated with a first party such as, but not limited to, a person, a group, and a company. The presence information may be, but is not limited to, status, communication capability, and preference of the first party. At step 1020, the wireless device 120 generates a notification corresponding to the presence information associated with the first party to alert a second party, who may be the user of the wireless device 120. The notification generated by the wireless device 120 may be, but is not limited to, a visual notification (e.g., an icon, a graphical image, a light, a text message, a video message, a multimedia message, and a color change), an audio notification (e.g., a beep, a tone, an audio message, and a song), and a physical notification (e.g., a vibration and a temperature change) within the wireless device 120. For example, the wireless device 120 may automatically generate a visual notification corresponding to the status of the first party on a display within the wireless device 120. Alternatively, the wireless device 120 may generate a user-selectable notification to alert the second party. For example, the second party may set the wireless device 120 to vibrate when the first party becomes available for a communication session. Based on the presence information, the wireless device 120 at step 1030 may provide the communication interface for a communication session between the first and second parties. That is, the second party may communicate with the first party via the wireless device 120 based on the status, communication capability, and preference of the first party. For example, wireless device 120 may automatically dial the phone number for the first party when the first party becomes available for a voice call session. As another example, the second party may send a text message to the first party because the first party prefers to communicate via e-mail. As a result, the wireless device 120 may establish the communication interface based on the presence information so that the second party may communicate with the first party.

Many changes and modifications to the embodiments described herein could be made. The scope of some changes is discussed above. The scope of others will become apparent from the appended claims.

What is claimed is:

1. In a wireless communication system, a method for establishing a communication interface for a communication session, the method comprising:
   receiving presence information associated with a first party within a wireless device, the wireless device being operated by a second party;
   generating a notification within the wireless device to alert the second party, the notification corresponding to the presence information and a communication capability associated with the first party; and
   providing the communication interface for the communication session between the first and second parties based on the presence information and the communication capability,
   wherein the step of receiving presence information associated with the first party within the wireless device comprises receiving presence information associated with the first party within the wireless device in response to a trigger event, the trigger event comprising one of a registration, a user input and a change in status.

2. The method of claim 1, wherein the step of receiving presence information associated with the first party within the wireless device comprises receiving presence information associated with at least one of the communication capability and a preference of the communication capability of the first party.

3. The method of claim 1, wherein the step of receiving presence information associated with the first party within the wireless device comprises receiving presence information associated with the first party within one of a cellular telephone, a personal digital assistant (PDA), and a pager.

4. The method of claim 1, wherein the step of generating a notification within the wireless device to alert the second party comprises generating a notification corresponding to a preference of the communication capability of the first party to alert the second party.

5. The method of claim 1, wherein the step of providing the communication interface for the communication session between the first and second parties based on the presence information comprises providing the communication interface for one of a voice call session, a conference call session, a voicemail session, an e-mail session, a short messaging service (SMS) session, a multimedia messaging service (MMS) session, an instant messaging (IM) session, and a wireless application protocol (WAP) session between the first and second parties based on the presence information.

6. The method of claim 1, wherein the step of providing the communication interface for the communication session between the first and second parties based on the presence information comprises providing the communication interface for the communication session between the first and second parties in response to a user input based on the presence information.

7. The method of claim 1, wherein the wireless communication system operates in accordance with one of a code division multiple access (CDMA) based communication protocol, a time division multiple access (TDMA) based communication protocol, and a global service for mobile communications (GSM) based communication protocol.

8. A wireless device for establishing a communication interface, the wireless device comprising:
   a graphical user interface;
   a user input device; and
   a controller operatively coupled to the graphical user interface and a user input device, the controller comprising a processor and a memory operatively coupled to the processor, the controller being programmed to receive presence information associated with a first party within the wireless device, the wireless device being operable by a second party;

the controller being programmed to generate a notification within the wireless device to alert the second party, the notification corresponding to the presence information and the communication capability associated with the first party; and the controller being programmed to provide the communication interface for the communication session between the first and second parties based on the presence information and the communication capability, wherein the controller is a controller being programmed to receive presence information associated with the first party within the wireless device in response to a trigger event, the trigger event comprising one of a registration, a user input and a change in status.

9. The wireless device of claim 8, wherein the controller is a controller being programmed to receive presence information associated with at least one of the communication capability and a preference of the communication capability of the first party.

10. The wireless device of claim 8, wherein the controller is a controller being programmed to generate a notification corresponding to a preference of the communication capability of the first party to alert the second party.

11. The wireless device of claim 8, wherein the controller is a controller being programmed to provide the communication interface for one of a voice call session, a conference call session, a voicemail session, an e-mail session, a short messaging service (SMS) session, a multimedia messaging service (MMS) session, an instant messaging (IM) session, and a wireless application protocol (WAP) session between the first and second parties based on the presence information.

12. The wireless device of claim 8, wherein the controller is a controller being programmed to provide the communication interface for the communication session between the first and second parties in response to a user input based on the presence information.

13. The wireless device of claim 8 is one of cellular telephone, a personal digital assistant (PDA), and a pager.

14. The wireless device of claim 8 operates in accordance with one of a code division multiple access (CDMA) based communication protocol, a time division multiple access (TDMA) based communication protocol, and a global service for mobile communications (GSM) based communication protocol.

15. In a wireless communication system, wherein a processor operates in accordance with a computer program embodied on a computer-readable medium for establishing a communication interface for a communication session, the computer program comprising:

a first routine that directs the processor to receive presence information associated with a first party within a wireless device, the wireless device being operated by a second party;

a second routine that directs the processor to generate a notification within the wireless device to alert the second party, the notification corresponding to the presence information and a communication capability associated with the first party; and a third routine that directs the processor to provide the communication interface for the communication session between the first and second parties based on the presence information and the communication capability, wherein the first routine comprises a routine that directs the processor to receive presence information associated with the first party within the wireless device in response to a trigger event, the trigger event comprising one of a registration, a user input and a change in status.

16. The computer program of claim 15, wherein the first routine comprises a routine that directs the processor to receive presence information associated with at least one of the communication capability and a preference of the communication capability of the first party.

17. The computer program of claim 15, wherein the first routine comprises a routine that directs the processor to receive presence information associated with the first party within one of a cellular telephone, a personal digital assistant (PDA), and a pager.

18. The computer program of claim 15, wherein the second routine comprises a routine that directs the processor to generate a notification corresponding to a preference of the communication capability of the first party to alert the second party.

19. The computer program of claim 15, wherein the third routine comprises a routine that directs the processor to provide the communication interface for a voice call session, a conference call session, a voicemail session, an e-mail session, a short messaging service (SMS) session, a multimedia messaging service (MMS) session, an instant messaging (IM) session, and a wireless application protocol (WAP) session between the first and second parties based on the presence information.

20. The computer program of claim 15, wherein the third routine comprises a routine that directs the processor to provide the communication, interface for the communication session between the first and second parties in response to a user input based on the presence information.

21. The computer program of claim 15 operates in accordance with one of a code division multiple access (CDMA) based communication protocol, a time division multiple access (TDMA) based communication protocol, and a global service for mobile communications (GSM) based communication protocol.

* * * * *